United States Patent
McRobbie et al.

(10) Patent No.: US 11,987,751 B2
(45) Date of Patent: *May 21, 2024

(54) TREATMENT OF SUBTERRANEAN FORMATIONS

(71) Applicant: INNOSPEC LIMITED, Ellesmere Port (GB)

(72) Inventors: Ian Malcolm McRobbie, Ellesmere Port (GB); William Trenholme, Ellesmere Port (GB)

(73) Assignee: INNOSPEC LIMITED, Ellesmere Port (GB)

( * ) Notice: Subject to any disclaimer, the term of this patent is extended or adjusted under 35 U.S.C. 154(b) by 112 days.

This patent is subject to a terminal disclaimer.

(21) Appl. No.: 17/429,795

(22) PCT Filed: Feb. 11, 2020

(86) PCT No.: PCT/GB2020/050314
§ 371 (c)(1),
(2) Date: Aug. 10, 2021

(87) PCT Pub. No.: WO2020/165576
PCT Pub. Date: Aug. 20, 2020

(65) Prior Publication Data
US 2022/0127521 A1    Apr. 28, 2022

(30) Foreign Application Priority Data

Feb. 12, 2019   (GB) ..................... 1901928

(51) Int. Cl.
*C09K 8/66*       (2006.01)
*C06B 29/00*      (2006.01)
(Continued)

(52) U.S. Cl.
CPC .............. *C09K 8/665* (2013.01); *C06B 29/00* (2013.01); *C06B 31/02* (2013.01);
(Continued)

(58) Field of Classification Search
None
See application file for complete search history.

(56) References Cited

U.S. PATENT DOCUMENTS 3,288,658 A * 11/1966 Ferguson ................ C06B 47/14
86/20.12
3,449,181 A *  6/1969 Armantrout ............ C06B 47/14
149/43
(Continued)

FOREIGN PATENT DOCUMENTS

CA       2689187 A1    6/2010
CN       1554725 A    12/2004
(Continued)

OTHER PUBLICATIONS

Translation of RU-2197606-C1 (Year: 2003).*
(Continued)

*Primary Examiner* — Angela M DiTrani Leff
(74) *Attorney, Agent, or Firm* — Shumaker, Loop & Kendrick, LLP (57) ABSTRACT

A method of treating a subterranean formation by contacting the formation with the following: (a) ammonium compound; (b) an oxidizing agent selected from a perchlorate or a nitrite or combinations thereof; and (c) sulfamic acid.

22 Claims, 1 Drawing Sheet

(51) Int. Cl.
- *C06B 31/02* (2006.01)
- *E21B 43/24* (2006.01)
- *E21B 43/26* (2006.01)
- *E21B 43/27* (2006.01)
- *E21B 31/00* (2006.01)

(52) U.S. Cl.
CPC ...... *E21B 43/2405* (2013.01); *E21B 43/2605* (2020.05); *E21B 43/27* (2020.05); *E21B 31/00* (2013.01)

(56) References Cited

U.S. PATENT DOCUMENTS

| | | | |
|---|---|---|---|
| 3,660,182 A | 5/1972 | Cook et al. | |
| 3,839,107 A * | 10/1974 | Clark | C06B 47/14 149/46 |
| 4,055,449 A | 10/1977 | Wasson | |
| 4,274,893 A | 6/1981 | Mars et al. | |
| 4,294,633 A | 10/1981 | Clay | |
| 4,294,663 A | 10/1981 | Tennyson | |
| 4,572,296 A | 2/1986 | Watkins | |
| 4,580,633 A | 4/1986 | Watkins et al. | |
| 4,846,277 A | 7/1989 | Khalil et al. | |
| 11,739,256 B2 * | 8/2023 | McRobbie | C09K 8/62 166/280.2 |
| 11,753,583 B2 * | 9/2023 | McRobbie | C09K 8/845 166/300 |
| 2009/0110609 A1 | 4/2009 | Roscioli | |
| 2010/0122815 A1 | 5/2010 | Zamora et al. | |
| 2013/0126169 A1 | 5/2013 | Al-Nakhli et al. | |
| 2014/0144632 A1 * | 5/2014 | Zavolzhski | C09K 8/82 166/280.2 |
| 2014/0144639 A1 | 5/2014 | Nguyen et al. | |
| 2015/0175879 A1 * | 6/2015 | Al-Nakhli | E21B 36/008 166/300 |
| 2015/0361328 A1 * | 12/2015 | Almutairi | E21B 43/24 166/300 |
| 2016/0244659 A1 * | 8/2016 | Shahin | E21B 43/16 |
| 2016/0265326 A1 | 9/2016 | Nguyen et al. | |
| 2016/0266326 A1 * | 9/2016 | Gniadek | G02B 6/3817 |
| 2016/0376884 A1 * | 12/2016 | Al-Nakhli | E21B 49/00 166/300 |
| 2017/0081584 A1 | 3/2017 | Shahin et al. | |
| 2018/0209240 A1 * | 7/2018 | Gupta | E21B 33/13 |
| 2018/0291720 A1 | 10/2018 | Cairns et al. | |

FOREIGN PATENT DOCUMENTS

| | | | | |
|---|---|---|---|---|
| CN | 101839127 A | * | 9/2010 | |
| CN | 104031625 A | | 9/2014 | |
| CN | 104931436 A | | 9/2015 | |
| CN | 108561111 A | | 9/2018 | |
| CN | 108690595 A | * | 10/2018 | C09K 8/584 |
| RU | 2197606 C1 | | 1/2003 | |
| RU | 2197606 C1 | * | 1/2003 | |
| RU | 2272897 C1 | | 3/2006 | |
| RU | 2373385 C1 | | 11/2009 | |
| RU | 2373385 C1 | * | 11/2009 | |
| RU | 2436828 C2 | | 5/2011 | |
| RU | 2721200 C1 | * | 5/2020 | |
| WO | 2013/181229 A1 | | 12/2013 | |
| WO | 2016065412 A1 | | 5/2016 | |
| WO | 2016/126351 A1 | | 8/2016 | |
| WO | WO-2016126351 A1 | * | 8/2016 | C09K 8/601 |

OTHER PUBLICATIONS

Translation of RU-2373385-C1 (Year: 2009).*
Translation of CN 101839127 A (Year: 2010).*
Translation of CN 108690595 A (Year: 2018).*
Translation RU 2721200 C1 (Year: 2020).*
International Search Report (ISR) for PCT/GB2020/050309 dated Apr. 9, 2020 (4 pages).
Written Opinion for PCT/GB2020/050309 dated Apr. 9, 2020 (8 pages).
International Search Report (ISR) for PCT/GB2020/050314 dated Apr. 9, 2020 (4 pages).
Written Opinion for PCT/GB2020/050314 dated Apr. 9, 2020 (6 pages).
International Search Report (ISR) for PCT/GB2020/050311 dated Apr. 9, 2020 (4 pages).
Written Opinion for PCT/GB2020/050311 dated Apr. 9, 2020 (8 pages).
International Search Report (ISR) for PCT/GB2020/050315 dated Apr. 9, 2020 (4 pages).
Written Opinion for PCT/GB2020/050315 dated Apr. 9, 2020 (7 pages).
Final Rejection for U.S. Appl. No. 17/429,807 dated Jan. 6, 2023 (19 pages).
Final Rejection issued for U.S. Appl. No. 17/429,783 dated Mar. 30, 2023 (37 pages).
Notice of Allowance issued for U.S. Appl. No. 17/429,799 dated Apr. 3, 2023 (15 pages).
Non-Final Office Action for U.S. Appl. No. 17/429,799, dated Jul. 21, 2022 (38 pages).
Requirement for Unity of Invention for U.S. Appl. No. 17/429,807, dated Aug. 2, 2022 (7 pages).
Non-Final Office Action for U.S. Appl. No. 17/429,807 dated Sep. 22, 2022 (35 pages).
PubChem, Compound Summary Sulfamic Acid, retrieved Sep. 20, 2022 from National Library of Medicine, https://pubchem.ncbi.nlm.nih.gov/compound/Sulfamic-acid (Year: 2022).
Wikipedia, Ammonium bisulfate, retrieved Sep. 20, 2022 from https://en.wikipedia.org/wiki/Ammonium_bisulfate (Year: 2022).
Non-Final Office Action for U.S. Appl. No. 17/429,783 dated Sep. 23, 2022 (43 pages).
Final Rejection for U.S. Appl. No. 17/429,799 dated Dec. 1, 2022 (25 pages).
Notice of Allowance issued for U.S. Appl. No. 17/429,807 dated May 19, 2023 (9 pages).
Non-Final Office Action (NFOA) issued for U.S. Appl. No. 17/429,783, dated Sep. 29, 2023 (31 pages).
Translation of CN 104031625 A (Year: 2014) (6 pages).
Non-Final Office Action (NFOA) issued for U.S. Appl. No. 17/429,783, mailed Jan. 18, 2024 (21 pages).

* cited by examiner

TREATMENT OF SUBTERRANEAN FORMATIONS

TECHNICAL FIELD

This invention relates to treatment of subterranean formations, for example to fracture formations and/or stimulate hydrocarbon, for example oil and/or gas, production.

BACKGROUND

Oil and gas reserves trapped within low permeability reservoirs such as shale and tight-gas formations are difficult and expensive to recover using traditional methods. Therefore to maximise the production from such formations, an extensive and complex fracture network must be created. The two most commonly employed methods are hydraulic fracturing and the use of explosives. While hydraulic fracturing does create fractures, the extent and complexity of the fracture patterns may be insufficient to maximise oil recovery and furthermore fracturing fluids are costly and can damage formations. The use of explosives is much more effective at creating multiple radial fractures but also creates large compacted zones of rock from which fluids cannot escape.

A wide range of fracturing methods and formulations has been proposed. However, known methods may be costly and/or use corrosive chemicals. There is, therefore, an ongoing need to develop improved fracturing methods and chemicals.

The present invention is based, in preferred embodiments, on treatment, for example fracturing, of subterranean formations by use of a mixture of chemicals which are arranged to undergo an exothermic reaction and/or produce large quantities of gas underground. The combination of heat and gas pressure can be used to treat, for example fracture, the formation. The combination of heat and gas may create new fractures, extend existing fractures or create microfractures within a hydraulic fracture. In preferred embodiments, the mixture of chemicals generates large gas volumes per mole of reactants in the mixture and releases non-toxic by-products.

It is known to generate heat and gas in downhole operations for use in a secondary fracturing operation. However, known methods produce a limited amount of gas. The pressures experienced within the formation means that a large amount of gas needs to be generated to produce a pressure sufficient to overcome the confining pressure within the wellbore.

Preferred embodiments of the following invention provide a means of increasing the amount of gas that can be rapidly generated by a chemical system, in order to generate a sufficient pressure within the formation to overcome the confining pressure and fracture the formation.

DETAILED DESCRIPTION

It is an object of the present invention to address problems associated with fracturing and/or stimulation of formations.

According to a first aspect of the invention, there is provided a method of treating a subterranean formation, the method comprising contacting the formation with the following:
(a) an ammonium compound;
(b) an oxidizing agent selected from a perchlorate or a nitrite or combinations thereof; and
(c) sulfamic acid.

Said ammonium compound is preferably selected to react with said oxidizing agent and/or said sulfamic acid to generate a gas. Said ammonium compound is preferably arranged to generate nitrogen gas on reaction as aforesaid. Said ammonium compound suitably includes a $NH_4^+$ moiety and the nitrogen atom thereof is incorporated into nitrogen gas produced on its reaction. For example, the ammonium compound may be a salt of ammonia and: a metal, a metal complex, an inorganic acid, or an organic acid.

The ammonium compound may be selected from: ammonium fluoride, ammonium chloride, ammonium bromide, ammonium iodide, ammonium nitrate, ammonium sulfate, ammonium hydrogensulfate, ammonium carbonate, ammonium carbamate, ammonium bicarbonate, ammonium hydroxide, ammonium acetate, ammonium borates, ammonium chromate, ammonium dichromate, ammonium cyanides, ammonium glutamate, ammonium molybdate, ammonium oxalate, ammonium hydrogenoxalate, ammonium phosphate monobasic, ammonium phosphate dibasic, ammonium thiosulfate, ammonium formate, ammonium sulfamate, ammonium sulfite, ammonium persulfate, ammonium sulfide, ammonium tartrate dibasic, ammonium thiocyanate, ammonium dihydrogen phosphate, ammonium glycinate or mixtures thereof.

Said ammonium compound is preferably selected from ammonium sulfamate, ammonium hydroxide, ammonium chloride, ammonium carbonate, ammonium bicarbonate, ammonium carbamate and ammonium formate.

Said ammonium compound most preferably includes, in addition to said $NH_4^+$ moiety, a second moiety which is preferably arranged to generate a gas (e.g. carbon dioxide or nitrogen) on reaction with said oxidizing agent and/or said sulfamic acid. In this case, said second moiety may comprise a nitrogen atom, for example a moiety NH or $NH_2$; or may comprise a carbon atom, for example a CO or $CO_2$ moiety. Said second moiety may comprise $NH_2SO_3$ or $CO_3$ (which may be part of a $HCO_3$ moiety). Said second moiety may comprise a sulfamate, carbonate or bicarbonate moiety. Said ammonium compound comprising a moiety which is preferably arranged to generate a gas may be selected from ammonium sulfamate, ammonium carbonate, ammonium bicarbonate, ammonium carbamate and ammonium formate.

Said method may comprise contacting the formation with one or more ammonium compounds, for example each being as described herein. In a preferred embodiment, the method comprises contacting the formation with only one type of ammonium compound.

Preferably, said oxidizing agent is selected from a perchlorate or a nitrite; and, more preferably, said oxidizing agent comprises a perchlorate or a nitrite, but not both.

A preferred perchlorate is an alkali metal perchlorate with sodium perchlorate being especially preferred.

Preferably, as between a perchlorate and nitrite, a nitrite is preferred. Said nitrite is preferably arranged to provide nitrite ions in aqueous solution.

Said oxidizing agent may include a moiety comprising a nitrogen atom bonded to an oxygen atom. It may include a nitrogen atom bonded to two oxygen atoms. Said oxidizing agent is preferably arranged to provide nitrite ions in aqueous solution. Said oxidizing agent is preferably a nitrite.

Said nitrite may be selected from alkali metal nitrites, alkaline earth metal nitrites, ammonium nitrite or organic nitrites. Said nitrite is preferably selected from lithium nitrite, sodium nitrite, potassium nitrite, calcium nitrite, magnesium nitrite, ammonium nitrite and combinations thereof. Said nitrite is preferably sodium nitrite.

Said ammonium compound, said oxidizing agent (e.g. a nitrite) and said sulfamic acid are preferably contacted so that they react and gas, for example comprising nitrogen and/or carbon dioxide, is generated in the formation.

A ratio (A) is defined as the number of moles of ammonium compound divided by the number of moles of nitrite contacted with the formation and/or reacted in the formation. There is no minimum or maximum amount of nitrite required for the invention and so ratio (A) may be any value greater than 0. Ratio (A) may be from 0.05 to 2.0, for example 0.1 to 0.8; and preferably ratio (A) is 0.2 to 0.6.

The method suitably comprises contacting the formation with said ammonium compound, oxidizing agent and said sulfamic acid. The aforementioned react to produce a gas, wherein suitably the gas produced includes nitrogen atoms originating in the acid. Thus, the method is preferably a method of treating a subterranean formation to generate gas within the formation. Production of gas may be arranged to fracture the formation in a region adjacent an area where said gas is produced.

Reference herein to a gas is intended to cover products which are gaseous at standard temperature and pressure (STP) (0° C. and 1 atm).

By use of sulfamic acid as aforesaid, the acid can be reacted to produce gas which can supplement gas produced by reaction of said ammonium and said oxidizing agent.

The method may comprise contacting the formation with one or more acids, wherein one of the acids is sulfamic acid as described.

A ratio (B) defined as the number of moles of said ammonium compound divided by the total number of moles of acid (e.g. the number of moles of said sulfamic acid) contacted with the formation and/or reacted with said ammonium compound and oxidizing agent in the formation may be greater than 0 and 10 or less. Ratio (B) may be below about 2.0 and so the ratio (B) may be between 0 (i.e. a large excess of acid) to 2, for example 0.1 to 1.1, especially 0.4 to 0.6.

The total number of moles of acid may comprise the sum of the number of moles of sulfamic acid and any other acid contacted with the formation and/or reacted with said ammonium compound and oxidizing agent in the formation. Sulfamic acid suitably makes up at least 50 mol %, preferably at least 90 mol %, more preferably at least 95 mol %, especially at least 99 mol % of the total number of moles of acid contacted with the formation and/or reacted as described.

A ratio (C) defined as the number of moles of said ammonium compound divided by the sum of the number of moles of one or more acids (e.g. the number of moles of said sulfamic acid) which are arranged to react, for example with other materials contacted with the formation, to produce a gas (e.g. nitrogen) as described may be greater than 0 and may be 10 or less. Ratio (C) may be in the range, 0 to 10, for example, 0.01 to 4, suitably 0.05 to 2, preferably, 0.1 to 1.1, and especially in the range 0.4 to 0.6.

A ratio (H) defined as the number of moles of oxidizing agent divided by the total number of moles of acid (e.g. the number of moles of sulfamic acid) (contacted with the formation and/or reacted with said ammonium compound and oxidizing agent in the formation) may be in the range 0.5-10, preferably 0.6-5.0, more preferably 0.75 to 3.5, especially 0.9 to 2.6.

A ratio (I) defined as the number of moles of oxidizing agent divided by the number of moles of sulfamic acid which are arranged to react, for example with other materials contacted with the formation, to produce a gas (e.g. nitrogen) as described may be in the range 0.5-10, preferably 0.6-5, more preferably 0.75-3.5 and, especially, 0.9-2.6.

Thus, preferably, the sulfamic acid does not simply catalyse another reaction, but rather is directly involved in gas generation by donating atoms other than hydrogen (e.g. by donation of nitrogen atoms) to the gas produced.

Said ammonium compound may be provided as a slurry, an emulsion or a solution. Said ammonium compound may be provided in water and the method may comprise selecting an aqueous solution of said ammonium compound. The solution may be of any suitable concentration up to a saturated solution. Said ammonium compound may or may not be encapsulated, for example with an encapsulant arranged to delay reaction with the oxidizing agent (e.g. nitrite) and/or sulfamic acid on contact therewith. Said ammonium compound is preferably not encapsulated.

Said oxidizing agent, for example nitrite, may be provided as a slurry, an emulsion or a solution. Said oxidizing agent, for example nitrite, may be provided in water and the method may comprise selecting an aqueous solution of said oxidizing agent, for example nitrite. The solution may be of any suitable concentration up to a saturated solution. Said oxidizing agent, for example nitrite, may or may not be encapsulated, for example with an encapsulant arranged to delay reaction with the ammonium compound and/or sulfamic acid on contact therewith. Said oxidizing agent, for example nitrite, is preferably not encapsulated.

Sulfamic acid may be provided in water for example as a solution or slurry in water. Said sulfamic acid may or may not be encapsulated. Said sulfamic acid is preferably not encapsulated, for example with an encapsulant arranged to delay reaction with the ammonium compound and/or the oxidizing agent.

Sulfamic acid has a limited solubility in water and may be formulated with an alkali, alkaline earth or ammonium bisulfate salt or a polar co-solvent for example methanol or formamide to increase its solubility.

In addition to the production of gas as described, said method may also produce heat to facilitate treatment of the formation.

Said method of treating said subterranean formation may be used in any subterranean formation that may benefit from the gas or heat rapidly generated by the reaction, for example to facilitate hydrocarbon production. The method may comprise treatment of said subterranean formation in a drilling operation, a stimulation operation, a hydraulic stimulation operation, a sand control operation, a completion operation, a scale inhibiting operation, a water-blocking operation, a clay stabilizer operation, a foam fracturing operation, a frac-packing operation, a gravel packing operation, a wellbore strengthening operation, a sag control operation, an acidising operation, an alkaline treatment operation, deposit removing operation, a 'Huff and Puff' operation, in a process for inhibiting 'frac hits', a wellbore damage removal operation, clean-up of a perforation, reduction of the hydrostatic pressure of the well, free stuck coiled tubing and/or pipe, a reservoir re-pressurisation operation, a depletion control operation, for far-field hydraulic fracture diversion, to reduce proppant settling, to reduce sand settling, an operation for increasing fracture complexity, or a fracturing operation.

Said method of treating a formation may be a 'Huff' and Puff operation.

'Huff and Puff' is a process that re-pressurises the near well area of the reservoir and reducing the viscosity of the oil in the surrounding formation. The reduction in oil viscosity can be achieved by pressurising the reservoir with a gas or fluid, comprising carbon dioxide which dissolves into the oil and reduces its viscosity. The pressurisation of the reservoir may be achieved by using any of the gas-generating reactions according to the invention. A typical 'Huff and Puff' operation would comprise a first step (i) of placing the gas generating chemicals within the wellbore and reacting them until the desired pressure is reached and a second 'shut-in' step (ii) wherein the well is sealed. Said shut-in step may be a full day or overnight. Once the well is opened production can resume.

Said method of treating a subterranean formation may be a process for inhibiting 'frac hits'.

A 'frac hit' occurs when wells have been drilled in close proximity and fractures formed in the more recently drilled well grow into and through the production area of the older well and in some cases cause damages to the older well. Fractures preferentially propagate through the weaknesses within the formation and so increasing the pressure in and about the old well can divert and/or deflect the new fractures away from the older wells. The pressurisation of the older well can be achieved by contacting the ammonium compound, oxidising agent, especially said nitrite, and sulfamic acid within the older wellbore. This may be carried out as a one off treatment or the ammonium compound, oxidising agent, especially said nitrite, and sulfamic acid may be continuously injected to maintain a desired pressure.

Said method may comprise treatment of said subterranean formation, for example to fracture the formation or increase the complexity of a fracture network and/or stimulate hydrocarbon, for example oil and/or gas, production. By stimulate hydrocarbon production we mean, providing a method that improves the flow of hydrocarbons from the formation into the production well. More preferably, said method comprises treatment of said subterranean formation to fracture the formation or increase the complexity of a fracture network to facilitate hydrocarbon, for example oil and/or gas, production. For example, said method may extend an existing fracture, create new fractures or create microfractures extending out from a hydraulic fracture.

Preferably, said method is used in: a stimulation operation, a hydraulic stimulation operation, a 'Huff and Puff' operation, in a process for inhibiting 'frac hits', a wellbore damage removal operation, clean-up of a perforation, reduction of the hydrostatic pressure of the well, freeing stuck coiled tubing and/or pipe, a re-pressurisation operation, a depletion control operation, for far-field hydraulic fracture diversion, to reduce proppant settling, to reduce sand settling, an operation for increasing fracture complexity, or a fracturing operation.

Said method of treating a formation may comprise a wellbore damage removal operation.

Said method of treating a formation may be to free stuck coiled tubing and/or pipe.

Said method of treating a formation may comprise cleaning equipment, for example drilling equipment such as coil tubing underground. Gas produced may be arranged to clean equipment by the gas pressure blowing off oil and/or other solid/liquid contaminants from the equipment.

Said method of treating a formation may comprise a reservoir re-pressurisation operation.

Said method of treating a formation may comprise far-field hydraulic fracture diversion.

Said method of treating a formation may comprise reducing proppant settling.

Said method of treating a formation may comprise a stimulation operation.

In one embodiment, said ammonium compound described in (a) and an oxidizing agent selected from a perchlorate or a nitrite as described in (b) may be injected into different wellbores such that the reactants diffuse through the formation until they contact each other and react with each other within the formation. In this case, preferably, the wellbores are adjacent to each other. The pressure and concentrations of the reactants may suitably be selected to control where within the formation the reaction substantially occurs. This method of placing the reactants downhole may be used for a reservoir re-pressurisation operation, a depletion control operation, a damage removal operation or an operation for the far-field diversion of hydraulic fractures.

The subterranean formation may comprise a source rock comprising hydrocarbons (e.g., oil or natural gas) and may include shale, sandstone, limestone or mixtures thereof. Said subterranean formation may be subsea.

Said method of said first aspect is preferably a method of treating said formation to stimulate the formation, for example to facilitate production of hydrocarbons, for example oil or gas from the formation. The method may comprise treating the formation to create or enhance a fracture in the formation. The method preferably comprises treatment of a formation which has already been fractured, wherein the method is arranged to enhance an existing fracture network and/or stimulate further hydrocarbon production from an existing formation.

The method may include introducing proppant and/or microproppant into the formation to enter fractures formed in the method. Proppant and/or microproppant may be included in a formulation introduced to the formation after the formation has been treated with said ammonium bicarbonate, oxidizing agent and optional other reagents as described.

The method may also include introducing the proppant and/or microproppant in one or more of the formulations used in said method, so as to prop any fractures or microfractures formed as a result of the method.

Said method may comprise introducing said ammonium compound, for example in aqueous solution, into the formation. Said ammonium compound may be directed towards a region of said formation it is desired to treat, for example fracture and/or stimulate. Said method may involve introducing said ammonium compound via an injection well. Coil-tubing (or the like) may be used to direct the ammonium compound towards said region.

Said method may comprise introducing said oxidizing agent, for example in aqueous solution, into the formation. Said oxidizing agent may be directed towards a region of said formation it is desired to treat, for example fracture and/or stimulate. Said method may involve introducing said oxidizing agent via an injection well. Coil-tubing (or the like) may be used to direct the compound (B) towards said region.

Said method may comprise introducing said sulfamic acid, for example in aqueous solution, into the formation. Said sulfamic acid may be directed towards a region of said formation it is desired to treat, for example fracture and/or stimulate. Said method may involve introducing said sulfamic acid, via an injection well. Coil-tubing (or the like) may be used to direct the sulfamic acid towards said region.

In the method, said ammonium compound and said oxidizing agent are preferably not contacted with one another above ground. They are preferably contacted underground, preferably during passage towards or after arrival at the region of said formation it is desired to treat.

In the method, sulfamic acid is preferably not contacted with said ammonium compound and oxidizing agent above ground. It is preferably contacted with said ammonium compound and/or oxidizing agent underground, preferably during passage towards or after arrival at, the region of said formation it is desired to treat.

In the method, for example in fracturing of a formation by production of gas within the formation, the sum of the wt % of a formulation (F1) (e.g. an aqueous formulation) comprising said ammonium compound, a formulation (F2) (e.g. an aqueous formulation) comprising said oxidizing agent and a formulation (F3) (e.g. an aqueous formulation) comprising said sulfamic acid introduced into the formation is at least 80 wt %, preferably at least 90 wt %, more preferably at least 98 wt % of the total weight of materials introduced into the formation as part of the fracturing of the formation by production of gas within the formation, as described. It is preferred that the treatment to produce gas comprises use of only three formulations, e.g. (F1), (F2) and (F3).

In another embodiment of the method, for example in fracturing of a formation by production of gas within the formation, the sum of the wt % of a formulation (F3) (e.g. an aqueous formulation) comprising said sulfamic acid and a formulation (F4) (e.g. an aqueous formulation) comprising said ammonium compound, said oxidizing agent, preferable said nitrite and an alkali, introduced into the formation is at least 80 wt %, preferably at least 90 wt %, more preferably at least 98 wt % of the total weight of materials introduced into the formation as part of the method of treating of the formation by production of gas and/or heat within the formation, as described in the first aspect. For the avoidance of doubt, the aforementioned sum of the wt % is not intended to include a formulation (eg an inert spacer) which may be introduced into the formation (and may contact formulation (F3) and/or (F4)) but which does not include an active ingredient which is involved in production of gas in the formation as described herein.

The sum of the wt % of oxidizing agent and water in formulation (F1) is suitably at least 80 wt %, preferably at least 90 wt %, more preferably at least 95 wt %.

The sum of the wt % of compound (B) and water in formulation (F2) is suitably at least 80 wt %, preferably at least 90 wt %, more preferably at least 95 wt %.

The sum of the wt % of sulfamic acid and water in formulation (F3) is suitably at least 50 wt %, preferably at least 90 wt %, more preferably at least 95 wt %.

The sum of the wt % of ammonium compound, oxidising agent, preferably said nitrite, alkali and water in formulation (F4), when introduced into the formation, is suitably at least 80 wt %, preferably at least 90 wt %, more preferably at least 95 wt %.

In another embodiment of the method, for example in fracturing of a formation by production of gas within the formation, a formulation (F5) may be provided, wherein said formulation is aqueous and comprises said ammonium compound and said sulfamic acid. In the method, for example in fracturing of a formation by production of gas within the formation, the sum of the wt % of formulation (F5) and a formulation (F2) (e.g. an aqueous formulation) comprising said oxidizing agent, preferably said nitrite, is at least 80 wt %, preferably at least 90 wt %, more preferably at least 98 wt % of the total weight of materials introduced into the formation as part of the fracturing of the formation by production of gas within the formation, as described. For the avoidance of doubt, the aforementioned sum of the wt % is not intended to include a formulation (eg an inert spacer) which may be introduced into the formation (and may contact formulation (F5) and/or (F2)) but which does not include an active ingredient which is involved in production of gas in the formation as described herein.

Any of formulations (F1), (F2), (F3), (F4) and (F5) may comprise additional components commonly used in the treatment of subterranean formations for example: biocides, breakers, co-solvents, corrosion inhibitors, cross-linking agents, fluid loss control additives, friction reducers, iron control agents, oxygen scavengers, pH adjusting agents, proppants, microproppants, salts, scale inhibitors, surfactants, sulfide scavengers, viscosifying agents, clay stabilisers and the like.

Co-solvents may be used in any of formulations (F1), (F2), (F3), (F4) and (F5) to improve the solubility of the reagents in water and/or the thermodynamic stability of the solution. The co-solvents are preferably polar solvents for example: alcohols, glycols, amides, esters, ketones, sulfoxides etc. Suitably, the co-solvents are methanol or formamide or mixtures thereof. Specific examples may be selected from methanol and/or formamide.

Any suitable method may be used to place reagents into a well and/or deliver to a desired position in a formation. The well may be a horizontal or vertical well. However, preferred methods keep selected reagents isolated from each other until they reach the desired location within the formation.

Coiled tubing may be used to place reagents downhole. In this case, the end of the tube is placed where gas generation is required. One solution is pumped through the tubing and another solution along the casing. For example, Formulation (F3) may be pumped through the coil and formulation (F4) may be pumped along the casing.

Coiled tubing may be especially useful to place the reagents downhole in: a fracturing operation, a perforation clean-up operation, a wellbore damage removal operation, an operation to reduce the hydrostatic pressure of a well, or to free stuck coiled tubing and/or pipe.

Spacers may be used to keep the reagents and/or compositions separate until they reach a desired position in the formation. In this technique, a fluid, preferably an inert fluid, would used to separate the two formulations of reactive components. Typically with this technique, 5-10 bbl of the inert fluid may be used. Examples of inert fluids suitable for this technique include, but are not limited to, pure water and oil.

In one embodiment, the formulations (F1), (F2) and (F3) are introduced, in any order, with an inert spacer separating each of the formulations. Formulation (F3) may be used as a spacer to separate formulations (F1) and (F2), In another embodiment formulations (F3) and (F4) may be introduced into the formations with an inert spacer separating the two formulations.

Spacers may be used to place the formulations downhole in the following operations: reservoir re-operation, a depletion control operation, a damage removal operation, for far-field hydraulic fracture diversion, a fracturing operation, to reduce sand or proppant settling.

The formulations may be provided as part of an emulsion, for example water-in-oil emulsions or double emulsions, for example water-in-oil-in-water. In a double emulsion, the inner water phase may be a formulation e.g. (F3) and the outer water phase may be a different formulation e.g. (F4).

In preferred embodiments described herein, the number of moles of gas generated per mole of reactants may be increased compared to prior art proposals.

The sum of the total weight in grams (g) of ammonium compound, oxidizing agent, preferably said nitrite, and acid(s) (including or consisting of sulfamic acid) introduced into the formation is herein referred to as SUM-W. The sum of the total volume of gas (e.g. $CO_2$ and/or $N_2$) in $cm^3$ generated by reaction of ammonium compound, oxidizing agent, preferably said nitrite, and said acid(s) is herein referred to as SUM-V. Preferably, in the method, the Reaction Efficiency is defined as the volume of gases produced divided by the weight of reactants (ie SUM-V divided by SUM-W). The Reaction Efficiency is suitably at least 100 $cm^3/g$, for example at least 160 $cm^3/g$, or at least 200 $cm^3/g$. It may be less than 300 $cm^3/g$.

The Reaction Efficiency as described may suitably be calculated based on weights of the specified reagents selected and the volume of gas generated by reaction thereof in a reaction carried out under controlled conditions at the surface, based on amounts of reagents which are to be introduced into the formation, since measurements within the formation itself are not practical. Values referred to are suitably measured at STP, unless otherwise stated.

To minimise the quantity of one or more of the formulations leaking off into the formation and to maximise the fracturing effect, it is desirable that the gas is rapidly generated after the components have been contacted with each other. The gas generation may substantially be complete within 10 minutes of all the components being contacted with each other. Preferably, the gas generation is substantially complete within 5 minutes of the components being contacted with each other.

The quantities of formulations introduced into the formation as part of the method may be suitably selected dependent on the features of the formation, for example the confining pressure, and the pressure required to achieve the desired effect of said method of treating said formation. Thus, it is anticipated that any quantity of the formulations may be used. However, preferably at least 1 bbl may be used, for example 10 to 500 bbl, or from 100 to 350 bbl, preferably from 150 to 250 bbl.

The rate at which one of more of the fluids is injected may suitably be adjusted according to the method of treating the formation and the method of delivering the components. For example, it may be injected at a rate sufficient to build up a pressure such as that it fractures the formation.

In some methods of treating a subterranean formation, it may be preferable to generate pulses of higher and lower pressures within the formation. This effect may be achieved by repeatedly reacting a gas producing formulation within the formation. Either mechanical, chemical or combinations of mechanical and chemical methods may be used to control the manner in which the formulations are contacted with the formation to produce a series of pressure pulses. Said pulses of pressure may be created in treating a subterranean formation in a method comprising:
  (i) introducing a first gas producing formulation into the formation so the formulation produces a gas in the formation;
  (ii) reducing the rate of gas production within the formation, so the pressure produced in this step is lower than in step (i) and may be 0;
  (iii) introducing a second gas producing formulation into the formation, which formulation may be the same or different to the first gas producing formulation, thereby to produce a pressure higher than in step (ii); and, optionally,
  (iv) reducing the rate of introduction of said second gas producing formulation into the formation.

Steps (ii) and (iii) may be suitably repeated to produce further pressure pulses as required.

Steps (i) through to (iv) may be carried out continuously, intermittently or a mixture of continuously and intermittently.

In step (ii), the reduction of rate of gas production in the formation may be achieved mechanically, for example by reducing or stopping the amount of one or more gas generating reagents being introduced into the formation.

Step (ii) may be achieved using chemical means. For example, in one embodiment, step (ii) may be achieved by pumping an inert fluid e.g. a spacer in between the pumping of gas producing formulations. In another embodiment, step (ii) may be achieved by pumping an inert fluid concurrently with the first gas producing formulation, so as to reduce the concentration of the gas producing formulation and the rate at which the gas is produced. Then, step (iii) may comprise stopping the pumping of the inert fluid.

In some embodiments the gas generating reagents used in the gas producing formulation used in step (i) may be non-stoichiometric. In this case step (ii) may occur when one of the reagents (herein reagent (P)) is consumed so gas generation stops, leaving an excess of the remaining reagents (herein reagents (Q)). Step (iii) may then comprise injecting a formulation comprising an excess of reagent (P). Steps (i) to (iii) may be repeated with the injected formulations being alternated. For example the method may comprise contacting the formation with 20 bbl of a solution of ammonium compound and acid and 10 bbl of a solution of sodium nitrite in step (i). Step (ii) occurs when the 10 bbl of sodium nitrite is consumed. Step (iii) may comprise injecting 10 bbl or more of sodium nitrite to produce a second pressure pulse. If the method is to be repeated, step (iii) may use a large excess of sodium nitrite.

According to a second aspect of the invention, there is provided a mixture for treating a subterranean formation, the mixture comprising:
  (a) an ammonium compound;
  (b) an oxidizing agent selected from a perchlorate or a nitrite or combinations thereof; and
  (c) sulfamic acid.

The mixture is preferably produced below ground, for example within a subterranean formation.

The mixture may include more than one acid, one of which is said sulfamic acid.

The ammonium compound, oxidizing agent and sulfamic acid may be as described in the first aspect.

According to a third aspect of the invention, there is provided a collocation adjacent a subterranean formation and/or adjacent an injection well of a subterranean formation, wherein said collocation comprises (P), (Q) or (R) as described below:
  (P) a formulation comprising an ammonium compound (e.g. formulation (F1) of the first aspect), which is preferably provided in a receptacle (e.g. a receptacle (A));
  a formulation comprising an oxidizing agent (e.g. formulation (F2) of the first aspect), which is preferably provided in a receptacle (e.g. a receptacle (B)); and, optionally (but preferably)
  a formulation comprising sulfamic acid (e.g. formulation (F3) of the first aspect), which is preferably provided in a receptacle (e.g. a receptacle (C));
  (Q) a formulation comprising an ammonium compound and an oxidising agent, preferably a nitrite which is preferably provided in a receptacle; and, optionally (but preferably)
  a formulation comprising sulfamic acid which is preferably provided in a receptacle;

(R) a formulation (F5), wherein said formulation is aqueous and comprises an ammonium compound and sulfamic acid, wherein said formulation is preferably provided in a receptacle; and a formulation (F2) (e.g. an aqueous formulation) comprising oxidizing agent, preferably a nitrite which is preferably provided in a receptacle.

The collocation suitably includes pipework for delivering the formulations into the subterranean formation. Receptacle (A) may communicate with a pipe (which may comprise coil tubing) arranged to deliver formulation (F1) into the formation. Receptacle (B) may communicate with a pipe (which may comprise coil tubing) arranged to deliver formulation (F2) into the formation. Receptacle (C) may communicate with a pipe (which may comprise coil tubing) arranged to deliver formulation (F3) into the formation.

In another embodiment, receptacle (D) may communicate with a pipe (which may comprise coil tubing) arranged to deliver formulation (F4) into the formation; and in the same treatment, receptacle (C) may communicate with a pipe (which may comprise coil tubing) arranged to deliver formulation (F3) into the formation.

According to a fourth aspect, there is provided the use of the following for gas generation in a subterranean formation:
(a) an ammonium compound;
(b) an oxidizing agent selected from a perchlorate or a nitrite or combinations thereof;
(c) sulfamic acid.

The number of moles of gas generated per mole of reactants may be increased compared to prior art proposals, especially prior art proposing reacting an ammonium compound with a mineral acid like hydrochloric acid.

The use may be as described in the first aspect.

Any feature of any aspect of any invention or embodiment described herein may be combined with any aspect of any other invention or embodiment described herein mutatis mutandis.

BRIEF DESCRIPTION OF THE DRAWINGS

Specific embodiments of the invention will now be described, by way of example, with reference to:

The FIGURE includes a graph showing gas volume generated for Examples 4 to 8.

WORKING EXAMPLES

Figure 1:
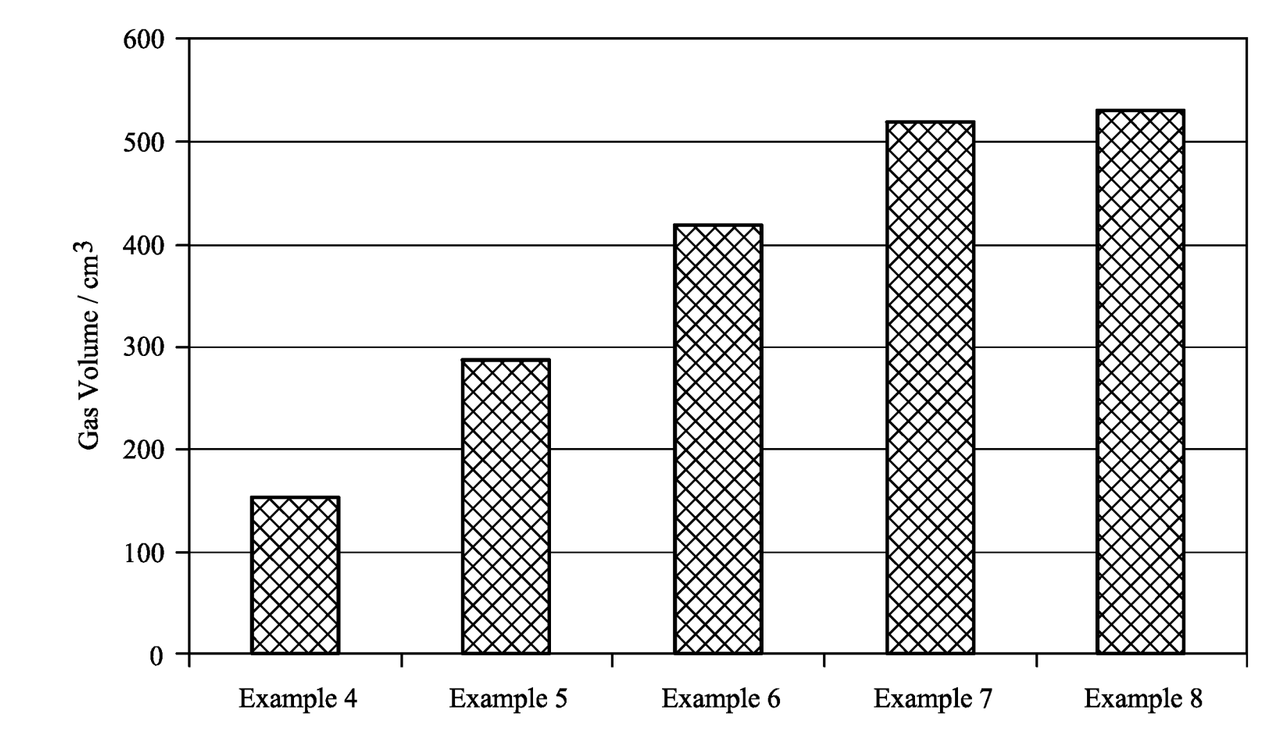

A subterranean formation may be treated with reagents which are arranged to react to produce a gas and/or heat within the formation. This may stimulate the formation by improving a fracture network within the formation, for example by creating new fractures, extending existing fractures, opening up naturally-occurring fractures or creating microfractures. The examples which follow describe reagents which may be used in a treatment.

Example 1—General Procedure for Undertaking Reactions 10 mmol of an ammonium compound and 30 mmol of a nitrite or perchlorate-containing compound were added to a round-bottom flask and dissolved in the minimum quantity of water. Suitable apparatus to measure gas released was arranged in position and the solution heated with stirring to 75° C. Once the solution had reached 75° C., 20 mmol of an acid was also heated to 75° C. and injected into the reaction vessel. The quantity of gas generated was recorded.

Examples 2 and 3—Comparison Between Using Hcl and Sulfamic Acid

In order to compare use of sulfamic acid and HCl, sulfamic acid was reacted with ammonium chloride, ammonium bicarbonate and ammonium sulfamate in example 3 and the gas volume determined. For comparison purposes, in Examples 2, the same reaction and assessment was undertaken wherein the sulfamic acid was replaced with HCl.

| Example | Gas generated when reacted with Ammonium Chloride/cm3 | Gas generated when reacted with Ammonium Bicarbonate/cm3 | Gas generated when reacted with Ammonium Sulfamate/cm3 |
| --- | --- | --- | --- |
| 2-HCl (comparative) | 330 | 560 | 920 |
| 3-Sulfamic acid | 960 | 1360 | 1320 |

It will be appreciated from Examples 2 and 3 that use of sulfamic acid results in increased levels of gas generation compared to reactions wherein sulfamic acid is replaced with commonly used hydrochloric acid.

Examples 4 to 8

The reaction investigated was the reaction between ammonium bicarbonate, sodium nitrite and sulfamic acid. The effect of changing the quantities of sulfamic acid was investigated, using the general procedure described in Example 1.

A summary of reagents used is provided in the table below:

| Example No. | Ammonium bicarbonate mmol | Sodium nitrite mmol | Sulfamic acid mmol |
| --- | --- | --- | --- |
| 4 | 10 | 10 | 5 |
| 5 | 10 | 10 | 7.5 |
| 6 | 10 | 10 | 10 |
| 7 | 10 | 10 | 20 |
| 8 | 10 | 10 | 25 |

Results are provided in the FIGURE, from which it is noted that there is no significant improvement in gas generation beyond 20 mmol sulfamic acid, implying a preferred ammonium bicarbonate to sulfamic acid ratio of 1:2.

Examples 9 and 10—Comparison Between Using Hcl and Sulfamic Acid at 1:2:4 Ratio of AMMONIUM SULFAMATE:ACID:SODIUM NITRITE A comparison of the performance of sulfamic acid and HCl were undertaken at the preferred ratios (as determined in other experiments not detailed) of 1:2:4 ratio of ammonium sulfamate:acid:sodium nitrite.

Example 9

2.9 mL of an aqueous solution of ammonium sulfamate (5 mmol) and sodium nitrite (20 mmol) were added to a round-bottom flask. Suitable apparatus to measure gas release was arranged in position and the solution was heated to 75° C. Once the solution had reached 75° C., 0.83 mL of a 12 M aqueous solution of hydrochloric acid (10 mmol), heated to the same temperature, was injected into the reaction vessel. The quantity of gas generated was recorded. The reaction efficiency was calculated by dividing the gas quantity by mass of reagents used.

Example 10

2.9 mL of an aqueous solution of ammonium sulfamate (5 mmol) and sodium nitrite (20 mmol) were added to a round-bottom flask. Suitable apparatus to measure gas release was arranged in position and the solution was heated to 75° C. Once the solution had reached 75° C., 4.75 mL of a 2.11 M aqueous solution of sulfamic acid (10 mmol), heated to the same temperature, was injected into the reaction vessel. The quantity of gas generated was recorded. The reaction efficiency was calculated by dividing the gas quantity by mass of reagents used.

The table below details the results.

| Example | mmol $NH_4NH_2SO_3$ | mmol $NaNO_2$ | Acid | mmol acid | Gas generated/ $cm^3$ | Total mass/g | Efficiency/ $cm^3$ per g |
|---|---|---|---|---|---|---|---|
| 4 (comparative) | 5 | 20 | Hydrochloric | 10.0 | 460 | 2.95 | 156 |
| 5 | 5 | 20 | Sulfamic | 10.0 | 750 | 2.92 | 257 |

The results show that sulfamic acid is significantly advantageous over use of hydrochloric acid, in terms of volume of gas generated and reaction efficiency.

The reagents described herein may be used in treatment of a formation as described. Reagents may be delivered in receptacles to a well-head for subsequent injection, for example using coiled tubing as described herein, into the formation. Exemplary compositions including concentrations and amounts in pound (lb) are detailed in the table below. Pounds (lb) can be converted to kg by multiplication by 0.45.

| Composition | Acid | Acid conc/ M | Mass of acid solution/ lb | Amount of 0.83M $NH_4HCO_3$ solution/lb | Amount of 2.50M $NaNO_2$ solution/lb |
|---|---|---|---|---|---|
| Eg 11 | Sulfamic | 2.11 | 8130 | 2531 | 6626 |

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of treating a subterranean formation, the method comprising:
   (a) introducing an ammonium compound into the formation;
   (b) introducing an oxidizing agent into the formation, wherein said oxidizing agent is selected from a perchlorate and a nitrite or combinations thereof;
   (c) introducing sulfamic acid as a solution or slurry in water into the formation; and
   (d) contacting the formation with said ammonium compound, said oxidizing agent and said sulfamic acid;
   wherein said ammonium compound reacts with said oxidizing agent and/or said sulfamic acid to generate a gas in the formation;
   wherein said sulfamic acid reacts to produce a gas, wherein the gas produced includes nitrogen atoms originating in the sulfamic acid; and
   wherein a ratio (B) defined as the number of moles of ammonium compound divided by the total number of moles of sulfamic acid contacted with the formation is greater than 0 and is 10 or less.

2. The method according to claim 1, wherein the method comprises treating the formation to create or enhance a fracture in the formation.

3. The method according to claim 2, wherein in the method the sum of the wt % of a formulation (F1) comprising said ammonium compound, a formulation (F2) comprising said oxidizing agent and a formulation (F3) comprising said sulfamic acid introduced into the formation is at least 98 wt %, of the total weight of materials introduced into the formation.

4. The method according to claim 1, wherein said oxidizing agent comprises a nitrite which, optionally, is sodium nitrite.

5. The method according to claim 1, wherein said ammonium compound and said oxidizing agent are contacted so they react and nitrogen and carbon dioxide are generated in the formation.

6. The method according to claim 1, wherein a ratio (A) defined as the number of moles of ammonium compound divided by the number of moles of nitrite contacted with the formation and/or reacted in the formation is in the range 0.05 to 2.0.

7. The method according to claim 1, wherein said ammonium compound is selected from ammonium fluoride, ammonium chloride, ammonium bromide, ammonium iodide, ammonium nitrate, ammonium sulfate, ammonium hydrogen sulfate, ammonium carbonate, ammonium carbamate, ammonium bicarbonate, ammonium hydroxide, ammonium acetate, ammonium borates, ammonium chromate, ammonium dichromate, ammonium cyanides, ammonium glutamate, ammonium molybdate, ammonium oxalate, ammonium hydrogen oxalate, ammonium phosphate monobasic, ammonium phosphate dibasic, ammonium thiosulfate, ammonium formate, ammonium sulfamate, ammonium sulfite, ammonium persulfate, ammonium sulfide, ammonium tartrate dibasic, ammonium thiocyanate, ammonium dihydrogen phosphate and ammonium glycinate or mixtures thereof.

8. The method according to claim 1, wherein said ammonium compound includes, in addition to a $NH_4^+$ moiety, a second moiety which is arranged to generate a gas on reaction with said oxidizing agent and/or said sulfamic acid.

9. The method according to claim 8, wherein said second moiety comprises a sulfamate, carbonate or bicarbonate moiety.

10. The method according to claim 1, wherein a ratio (C) defined as the number of moles of ammonium compound divided by the sum of the number of moles of sulfamic acid which react with other materials contacted with the formation to produce a gas is greater than 0 and is 10 or less.

11. The method according to claim 1, wherein said ammonium compound is provided as a slurry, an emulsion or a solution; and wherein the method comprises selecting an aqueous solution of said oxidizing agent.

12. The method according to claim 1, wherein:
the sum of the total weight in grams (g) of ammonium compound, oxidizing agent and sulfamic acid introduced into the formation is herein referred to as SUM-W;
the sum of the total volume in cm$^3$ of gas generated by reaction of ammonium compound, oxidizing agent and said sulfamic acid is herein referred to as SUM-V;
wherein, in the method, the Reaction Efficiency is defined as SUM-V divided by SUM-W;
wherein the Reaction Efficiency is at least 100 cm$^3$/g and is less than 300 cm$^3$/g.

13. The method according to claim 1, wherein said ammonium compound is ammonium bicarbonate and the method comprises producing pulses of pressure within the formation by controlling contact and/or amounts of ammonium bicarbonate, oxidizing agent and/or sulfamic acid within the formation.

14. The method according to claim 1, wherein said ratio (B) is less than 2.0.

15. A method of treating a subterranean formation, the method comprising:
(a) introducing an ammonium compound into the formation;
(b) introducing an oxidizing agent into the formation, wherein said oxidizing agent is selected from a perchlorate and a nitrite or combinations thereof;
(c) introducing sulfamic acid as a solution or slurry in water into the formation; and
(d) contacting the formation with said ammonium compound, said oxidizing agent and said sulfamic acid;
wherein said ammonium compound reacts with said oxidizing agent and/or said sulfamic acid to generate a gas in the formation;
wherein said sulfamic acid reacts to produce a gas, wherein the gas produced includes nitrogen atoms originating in the sulfamic acid; and
wherein a ratio (H) defined as the number of moles of oxidizing agent divided by the total number of moles of sulfamic acid contacted with the formation is in the range 0.5-10.

16. The method according to claim 15, wherein said ratio (H) is in the range 0.75 to 3.5.

17. The method according to claim 15, wherein said oxidizing agent comprises a nitrite which, optionally, is sodium nitrite.

18. A method of treating a subterranean formation, the method comprising:
(a) introducing an ammonium compound into the formation;
(b) introducing an oxidizing agent into the formation, wherein said oxidizing agent is selected from a perchlorate and a nitrite or combinations thereof;
(c) introducing sulfamic acid as a solution or slurry in water into the formation; and
(d) contacting the formation with said ammonium compound, said oxidizing agent and said sulfamic acid;
wherein said ammonium compound reacts with said oxidizing agent and/or said sulfamic acid to generate a gas in the formation;
wherein said sulfamic acid reacts to produce a gas, wherein the gas produced includes nitrogen atoms originating in the sulfamic acid;
wherein a ratio (B) defined as the number of moles of ammonium compound divided by the total number of moles of sulfamic acid contacted with the formation is greater than 0 and is 10 or less; and
wherein a ratio (H) defined as the number of moles of oxidizing agent divided by the total number of moles of sulfamic acid contacted with the formation is in the range 0.5-10.

19. The method according to claim 18, wherein said ratio (B) is less than 2.0 and said ratio (H) is in the range 0.75 to 3.5.

20. The method according to claim 19, wherein said oxidizing agent comprises a nitrite.

21. The method of treating a subterranean formation according to claim 19, to generate gas within the formation so as to create or enhance a fracture in the formation, undertake a 'Huff and Puff' operation or reduce proppant settling, wherein said ammonium compound includes, in addition to a $NH_4^+$ moiety, a second moiety which generates carbon dioxide or nitrogen on reaction with said oxidizing agent and/or said sulfamic acid;
wherein:
the sum of the total weight in grams (g) of ammonium compound, oxidizing agent and sulfamic acid introduced into the formation is herein referred to as SUM-W;
the sum of the total volume in cm$^3$ of gas generated by reaction of ammonium compound, oxidizing agent and said sulfamic acid is herein referred to as SUM-V;
wherein, in the method, the Reaction Efficiency is defined as SUM-V divided by SUM-W;
wherein the Reaction Efficiency is at least 100 cm$^3$/g and is less than 300 cm$^3$/g.

22. The method according to claim 18, wherein said oxidizing agent comprises a nitrite which, optionally, is sodium nitrite.

* * * * *